United States Patent Office 2,977,705
Patented Apr. 4, 1961

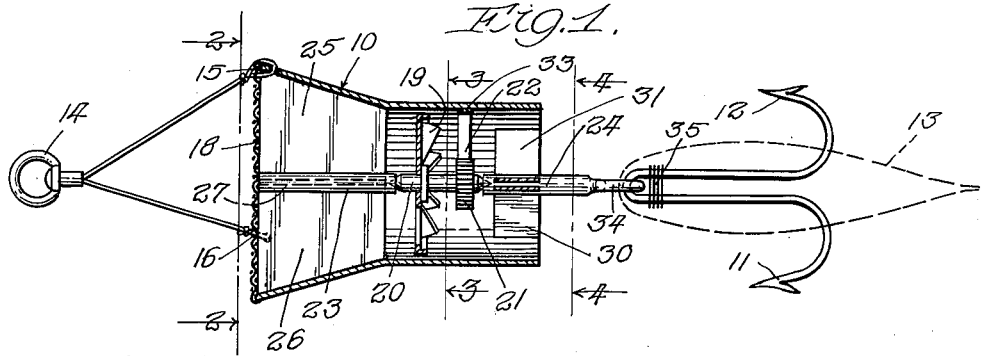

2,977,705
ACOUSTIC ATTRACTION OF CARNIVOROUS FISH

René-Guy Busnel, Paris, France (Chemin de la Butte au Diable, Vauboyen/Bievre, Seine-et-Oise, France)

Filed July 24, 1956, Ser. No. 599,827

5 Claims. (Cl. 43—17.1)

This invention relates to the acoustic attraction of carnivorous fish and means for producing said acoustic attraction.

My invention relates to the transmission of a selected acoustic signal having a steep wave front which is transmittable in the aqueous habitat of fresh water and salt water carnivorous fish and which serves to produce a desired oriented attraction on said fish. The acoustic energy of the signal need not be concentrated near any one frequency or separated set of frequencies. For example, effective results may be obtained when the frequency spectrum of the signal falls within the frequency range of 50 cycles/sec. to 150 kc./sec. However, it is essential that the shape of the curve formed by drawing a line through the maxima of each of the cycles present in one pulse of sound, referred to as an envelope, be composed of transients having a steep wave front. The phrase "steep wave front" is herein intended to refer to the rapid rise of the sound wave from a zero level, measured in terms of cycles which constitute the acoustic signal or time directly, to an amplitude value sufficient to produce a desired oriented attraction on carnivorous fish.

For example, a very effective signal may be produced by emitting 5 or 10 impulses produced at the rate of 10 to 15 per minute, wherein the intensity of the signal is above 60 decibels.

The amplitude of the transmitted sound impulse at the position of the fish is an inverse function of the distance between the fish and the source of the signal and is directly proportional to the amplitude of the signal at its source.

Many different types of instruments or equipment capable of producing the desired signal by mechanical or electric excitation may be used. For example, electro-oscillators, electromagnetic vibrating devices, tuning forks, special types of loud-speakers, and the like may be used.

In the accompanying drawings:

Figure 1 is a longitudinal sectional view of one device which may be used for producing an oriented acoustic attraction on carnivorous fish; a fish hook assembly is shown secured to said device;

Figure 2 is a front elevational view on the line 2—2 of Figure 1;

Figure 3 is a sectional view on the line 3—3 of Figure 1;

Figure 4 is a rear elevational view of the device shown in Figure 1 on the line 4—4 of said figure;

Figure 5 shows an oscillogram of a suitable acoustic signal which was obtained with a cathode ray oscillograph; a time reference signal of 25 cycles/sec. is shown immediately below this oscillogram;

Figure 6 is an expanded oscillogram which shows the details of the individual cycles in the envelope of the above-mentioned oscillogram shown in Figure 5.

Figure 1 shows an acoustic signal-emitting device 10 which may be constructed of aluminum, stainless steel, and the like. This device may be secured to a fishing line and manipulated by successive and non-continuous movements so as to emit a suitable acoustic signal having a steep wave front; a fish hook assembly comprising hooks 11 and 12 may be secured to the device; if desired, a lure 13 may be used in conjunction with the hooks.

The acoustic signal device 10 may be secured to a fishing line at the ring 14 which, in turn, is secured to the device at 15, 16, and 17 by means of nylon string and the like.

In operation, the device may be accelerated through the water by manipulation of the fishing line so as to cause water to pass through the protective screen 18 into the confines of the device, thus causing the propeller 19 to rotate drive shaft 20. Rotation of the drive shaft causes the corrugated wheel 21 to rotate and excite the free end of a resilient metal ribbon 22 which is secured to the device at 33, as the free end of the ribbon or sonifer frictionally engages the rotating corrugated serrated surface of the wheel as shown in Figures 1 and 4. This excitation produces transient vibrations.

As shown in Figure 1, the drive shaft is pivotally mounted to fixed, supporting shafts 23 and 24 in such a manner as to permit the drive shaft to rotate with comparatively little friction. The shaft 23 is mounted in the device by means of web-like supports 25, 26, 27, and 28; the shaft 24 is mounted in the device by means of web-like supports 29, 30, 31, and 32. The hooks and lure may be secured to the ring 34 at the end of the shaft 24 by means of nylon string 35 and the like.

When the device is accelerated through the water so as to produce a suitable acoustic signal having a steep wave front, the sound waves emitted therefrom provide a source of oriented attraction to carnivorous fish which are within effective range of the source of the signal. When carnivorous fish approach the device they may also be attracted by the lure or bait which may be secured to the hooks. Once fish "strike" the hook, they may be "landed" in a conventional manner.

In the event a stationary acoustic signal-emitting device is used, nets, traps, or other means may be used for capturing fish which are attracted to the device.

Figure 5 shows an oscillogram 40 of a suitable signal which was obtained with a cathode ray oscillograph. The oscillogram 40 portrays graphically the signal generated by the device shown in Figure 1. This wave shape is produced by the intermittent striking of the resilient metal ribbon 22 upon the corrugated wheel 21. It is this intermittent striking or sudden impact of one metal against the other that produces the steep wave front that is critical to my invention. A time reference signal 41 of 25 cycles/sec. is shown immediately below the oscillogram. Figure 6 is an expanded oscillogram 42 which shows the details of the individual cycles of oscillogram 40.

The foregoing detailed description has been given for clearness of understanding only, and no unnecessary limitations should be understood therefrom, as modifications will be obvious to those skilled in the art.

I claim:

1. In an artificial, acoustic signal-emitting device for transmitting selective acoustic signals in water, said signals having a frequency spectrum in the range 50 cycles/sec. to 150 kc./sec. and a steep wave front: chamber means having opposed, spaced openings which permit water to pass through said chamber; a rotary drive shaft rotatably mounted in said chamber between said openings; propeller means secured to said shaft; and metal signal inducing means operatively associated with said shaft in spaced relationship to said propeller means so that rotation of said shaft causes said signal inducing means to be activated so as to emit signals having the aforesaid characteristics.

2. In an artificial, acoustic signal-emitting device for transmitting selected acoustic signals in water, said signals having a frequency spectrum in the range 50 cycles/sec. to 150 kc./sec. and a steep wave front: chamber means having opposed, spaced openings which permit water to pass through said chamber; a rotary drive shaft rotatably mounted in said chamber between said openings; propeller means secured to said shaft; means having corrugated surfaces circumscribing said shaft and mounted thereon positioned in spaced relationship to said propeller means, and resilient means positioned in said chamber so that rotation of said corrugated surfaces causes said resilient means to frictionally engage said surfaces so as to produce transient signals having the aforesaid characteristics.

3. An artificial, acoustic signal-emitting means for transmitting a series of selected acoustic signals of a complex wave form in water, said signals having a selective transient frequency spectrum in the range of 50 cycles/sec. to 150 kc./sec. and a steep wave front, said signal-emitting means comprising a casing with a rotatable element therein, said element having a peripheral surface with an irregular, pulse-producing toothed edge, a sonifer engaged with said irregular edge so that rotation of said element causes said sonifer to move over said edge to generate said series of signals, and propelling means operatively associated with said rotatable element for rotating said rotatable element and operating said signal-emitting means by the movement of said casing through water.

4. An artificial, acoustic signal-emitting means for transmitting a series of selected acoustic signals of a complex wave form in water, said signals having a selective transient frequency spectrum in the range of 50 cycles/sec. to 150 kc./sec. and a steep wave front, comprising a casing having a rotary drive shaft rotatably mounted therein, propeller means secured to said shaft, metal signal-inducing means operatively associated with said shaft in spaced relationship to said propeller means so that rotation of said shaft causes said signal-inducing means to be activated so as to emit signals having the aforesaid characteristics upon movement of said casing through water.

5. The artificial, acoustic signal-emitting means of claim 4 wherein a fish hook is operatively associated therewith.

References Cited in the file of this patent

UNITED STATES PATENTS

| | | |
|---|---|---|
| 2,233,693 | Clarke | Mar. 4, 1941 |
| 2,624,145 | Wehn | Jan. 6, 1953 |
| 2,737,749 | Trout | Mar. 13, 1956 |
| 2,750,919 | Pearson | June 19, 1956 |
| 2,757,475 | Pankove | Aug. 7, 1956 |
| 2,881,548 | Backe | Apr. 14, 1959 |

FOREIGN PATENTS

| | | |
|---|---|---|
| 673,826 | Great Britain | June 11, 1952 |

UNITED STATES PATENT OFFICE
CERTIFICATION OF CORRECTION

Patent No. 2,977,705                                    April 4, 1961

René-Guy Busnel

It is hereby certified that error appears in the above numbered patent requiring correction and that the said Letters Patent should read as corrected below.

Column 2, line 21, after "corrugated" insert -- or --; column 4, line 9, before "metal" insert -- and --.

Signed and sealed this 29th day of August 1961.

(SEAL)
Attest:

ERNEST W. SWIDER                                    DAVID L. LADD
Attesting Officer                                      Commissioner of Patents